US011153374B1

United States Patent
Yu et al.

(10) Patent No.: US 11,153,374 B1
(45) Date of Patent: Oct. 19, 2021

(54) ADAPTIVE CLOUD REQUEST HANDLING

(71) Applicant: SAP SE, Walldorf (DE)

(72) Inventors: Xia Yu, Shanghai (CN); Dabin Feng, Shanghai (CN); Wanshun Zhang, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/091,974

(22) Filed: Nov. 6, 2020

(51) Int. Cl.
G06F 15/173 (2006.01)
H04L 29/08 (2006.01)

(52) U.S. Cl.
CPC ...... H04L 67/1027 (2013.01); H04L 67/1029 (2013.01)

(58) Field of Classification Search
CPC .................. H04L 67/1027; H04L 67/1029
See application file for complete search history.

(56) References Cited

U.S. PATENT DOCUMENTS

| 7,346,695 | B1 * | 3/2008 | Masters | H04L 67/1027 |
| | | | | 709/219 |
| 7,584,262 | B1 * | 9/2009 | Wang | H04L 12/4625 |
| | | | | 709/217 |
| 9,268,663 | B1 * | 2/2016 | Siddiqui | G06F 11/3404 |
| 9,800,567 | B2 * | 10/2017 | Petrov | H04L 63/0823 |
| 10,320,680 | B1 * | 6/2019 | Mehr | H04L 47/125 |
| 10,659,366 | B1 * | 5/2020 | Mehr | H04L 67/1029 |
| 10,728,317 | B1 * | 7/2020 | James | H04L 67/1008 |
| 2001/0023442 | A1 * | 9/2001 | Masters | H04L 67/1017 |
| | | | | 709/227 |
| 2003/0225859 | A1 * | 12/2003 | Radia | H04L 67/1031 |
| | | | | 709/219 |
| 2004/0243709 | A1 * | 12/2004 | Kalyanavarathan | |
| | | | | H04L 67/1023 |
| | | | | 709/226 |
| 2007/0233843 | A1 * | 10/2007 | Frey-Ganzel | G06F 9/5083 |
| | | | | 709/223 |
| 2015/0371641 | A1 * | 12/2015 | Bruhn | G10L 19/005 |
| | | | | 704/268 |

* cited by examiner

Primary Examiner — Richard G Keehn
(74) Attorney, Agent, or Firm — Klarquist Sparkman, LLP

(57) ABSTRACT

A cloud computing system receives a plurality of requests originating from a plurality of tenants. Thereafter, a load balancer forming part of the cloud computing system dispatches each request to one of a plurality of groups of servers based on a group mapping table configured to optimize a cache hit ratio. Each group of servers includes a plurality of servers dispatching each request to one of the plurality of servers within each group of servers. The cloud computing system provides responses to the requests to the respective tenants as generated by the respective servers within the respective groups of servers. The group mapping table can be generated by monitoring historical request statistics for each of the tenants, monitoring current resource consumption by the plurality of groups of servers when handling requests from the tenants, and associating each tenant with one of the groups of servers based on such monitoring.

20 Claims, 8 Drawing Sheets

ADAPTIVE CLOUD REQUEST HANDLING

TECHNICAL FIELD

The subject matter described herein relates to enhanced techniques for handling tenant requests by backend servers forming part of a cloud computing system.

BACKGROUND

Cloud computing environments are increasingly handling more load in that, on the frontend, there can be hundreds of thousands of requests originating from tenant computing devices. These requests can, in turn, be handled by hundreds and sometimes thousands of servers in the backend. To improve the performance or response time, certain data such as metadata, session information and the like can be stored in server-side cache memory. With such an arrangement, subsequently received requests from the same tenant can be handled more rapidly by directing such requests to the same backend server so that they hit the cache. In contrast, if requests from a tenant are redirected to a backend server that has no cache associated with the tenant, the requests will need to be fully processed with certain data (e.g., metadata, session information, etc.) being cached at such server.

Assuming there are N servers in the backend, if a load balancer takes the round robin approach to dispatch the requests to various backend servers, the server cache hit ratio is 1/N. As cloud systems scale up in size, N increases and 1/N decreases, making the server cache hit ratio very low which, in turn, requires significant time to erase old data in server caches and build new data in the server caches.

A different approach to load balancing uses session persistence (also referred to as session stickiness) in which there is a specific association with a tenant and a server for the duration of a session. Such an arrangement can be problematic in that the request volume or frequency of each tenant may change. If the number of requests for a tenant dramatically increases and the requests are still redirected to same backend server, the resources of this server may be strained causing response delays or, in the extreme, exhaustion causing the server to crash. As an oversimplification, one manifestation of this problem occurs when one tenant consumes a large of amount of server resources such that a second tenant being serviced on that same server begins to see increased latency in its received responses received. Conversely, if the number of requests from a tenant significantly decreases and requests from other tenants are not redirected to the that backend server, such server may be underutilized thereby wasting available computing resources.

SUMMARY

In a first aspect, a cloud computing system receives a plurality of requests originating from a plurality of tenants. Thereafter, a load balancer forming part of the cloud computing system dispatches each request to one of a plurality of groups of servers based on a group mapping table which can be configured to optimize a cache hit ratio. Each group of servers includes a plurality of servers dispatching, within each group of servers, each request to one of the plurality of servers within each group of servers. The cloud computing system provides responses to the requests to the respective tenants as generated by the respective servers within the respective groups of servers. The group mapping table can be generated, for example, by first monitoring historical request statistics for each of the tenants, second monitoring current resource consumption by servers when handling requests from the tenants, and associating each tenant with one of the groups of servers based on the first and second monitoring in order to optimize the cache hit ratio.

There can, in some variations, be N servers and, for example, N/2 groups of servers.

A server group metric can be generated based on a weighting of values generated from the current resource consumption by servers including central processing unit (CPU) usage, memory consumption and input/output (I/O) consumption.

A tenant metric can be generated based on a weighting of values generated for each tenant based on historical request metrics for the tenant including a monitored number of requests and response times to handle the requests. The group mapping table can be configured so as to create groups of tenants having substantially similar aggregate tenant metrics.

A group monitor can be associated with each group of servers and can provide the current resource consumption by the groups of servers when handling requests from the tenants. The group monitors can be software agents executing on one or more of the servers of the respective groups of servers. The group monitors can transmit the current resource consumption information to a central monitor forming part of the load balancer. The central monitor can be a dedicated server or, alternatively, an agent executed by the load balancer.

In an interrelated aspect, request statistics associated with a plurality of requests received by a cloud computing system originating from each of a plurality of tenants are monitored. In addition, resource consumption by groups of servers forming part of the cloud computing system when handling the plurality of requests received by the cloud computing system is also monitored. The request statistics can be used to generate tenant metrics and the monitored resource consumption can be used to generate server group metrics. The tenant metrics and the server group metrics can then be used to generate a group mapping table that is configured to optimize a cache hit ratio by the groups of servers. The cloud computing system later receives a plurality of new requests originating from a plurality of tenants. A load balancer forming part of the cloud computing system dispatches each new request to be handled by one of a plurality of groups of servers based on the group mapping table. Responses to the new requests as generated by the respective groups of servers can then be provided by the cloud computing system to the respective tenants. One or more of the request statistics and the resource consumption can be continually or periodically monitored so that the group mapping table can accordingly be updated so as to optimize the cache hit ratio when the cloud computing system subsequently encounters varying tenant load scenarios.

Non-transitory computer program products (i.e., physically embodied computer program products, non-transitory computer readable media, etc.) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for more efficiently tenant requests with increase cache hit ratios at handling cloud servers.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter provides enhanced techniques for handling tenant requests in which cached information on cloud servers can be more readily reused.

Figure 1:
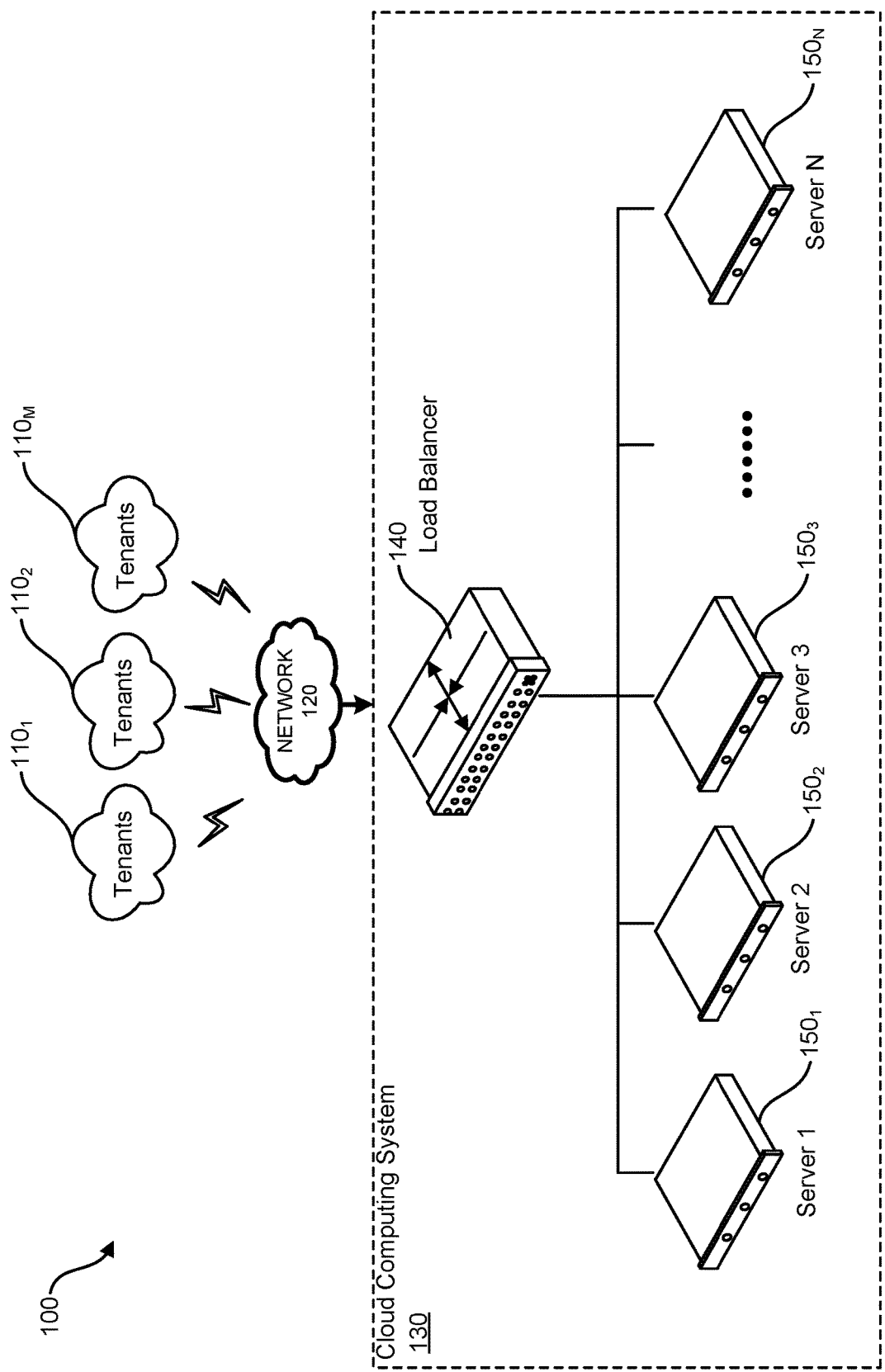
FIG. 1 is a first architecture diagram illustrating a cloud computing system.

With reference to diagram 100 of FIG. 1, a plurality of tenant computing devices 110 (e.g., clients, etc.) exchange data with a cloud computing system 130 by way of one more networks 120 (e.g., the internet, an on-premise private network, a distributed private network, etc.). Tenant, in this regard, can refer to a customer or enterprise having a plurality of associated computing devices that access the cloud computing system 130. The cloud computing system 130 includes at least one load balancer 140 which dispatches requests to various servers $150_1 \ldots _N$ forming part of the cloud computing system 130. As an illustration, if the load balancer 140 takes a round robin approach to dispatching/handling requests from the tenants $110_1 \ldots _N$, the server cache hit ratio is 1/N. If the load balancer 140 takes a session persistence approach to dispatch the request, the server cache hit ratio is improved; however, overall cloud system computing system 130 performance may suffer as the load on some servers may be too heavy while other servers remain idle.

Figure 2:
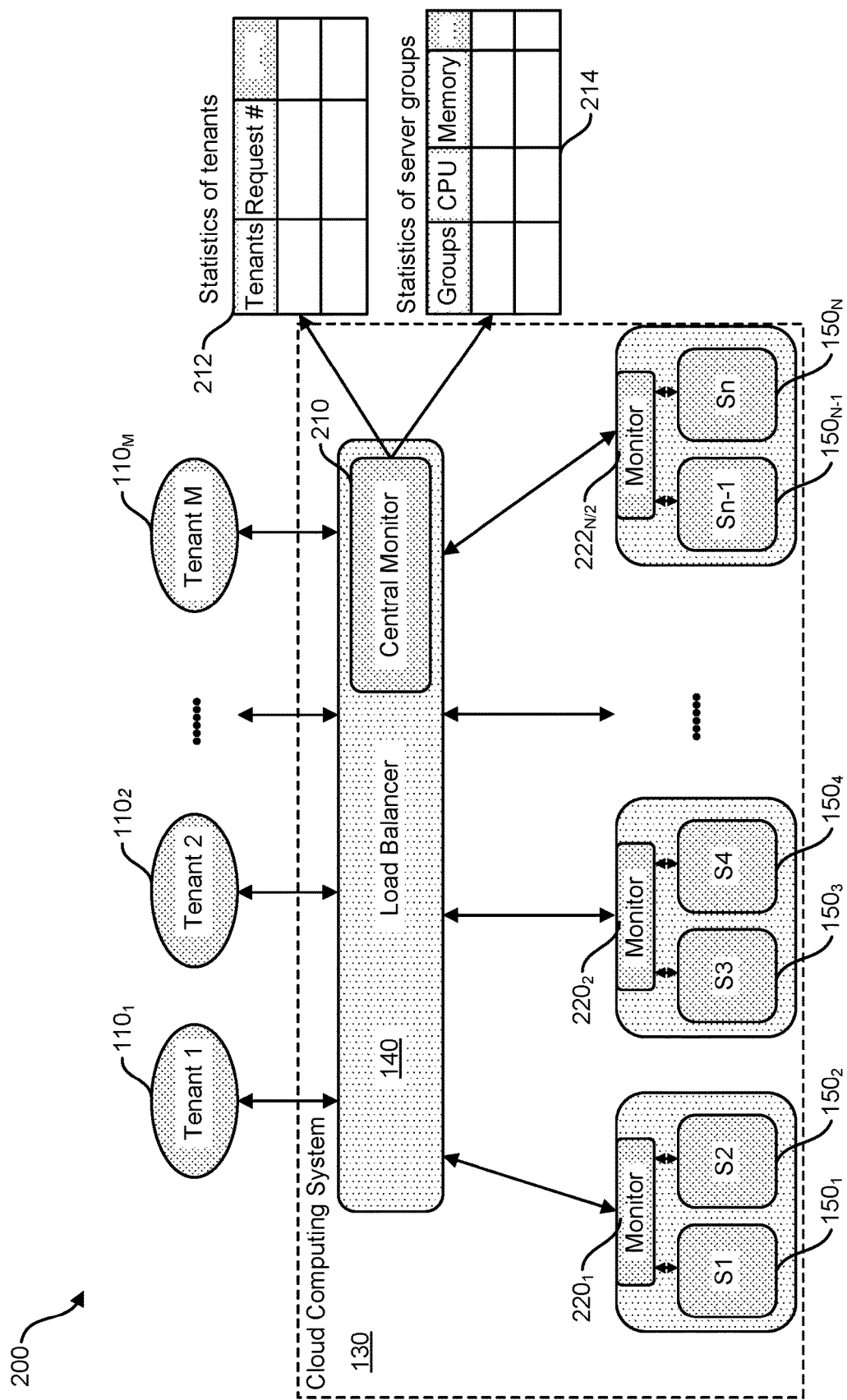
FIG. 2 is a second architecture diagram illustrating a cloud computing system.
Figure 5:
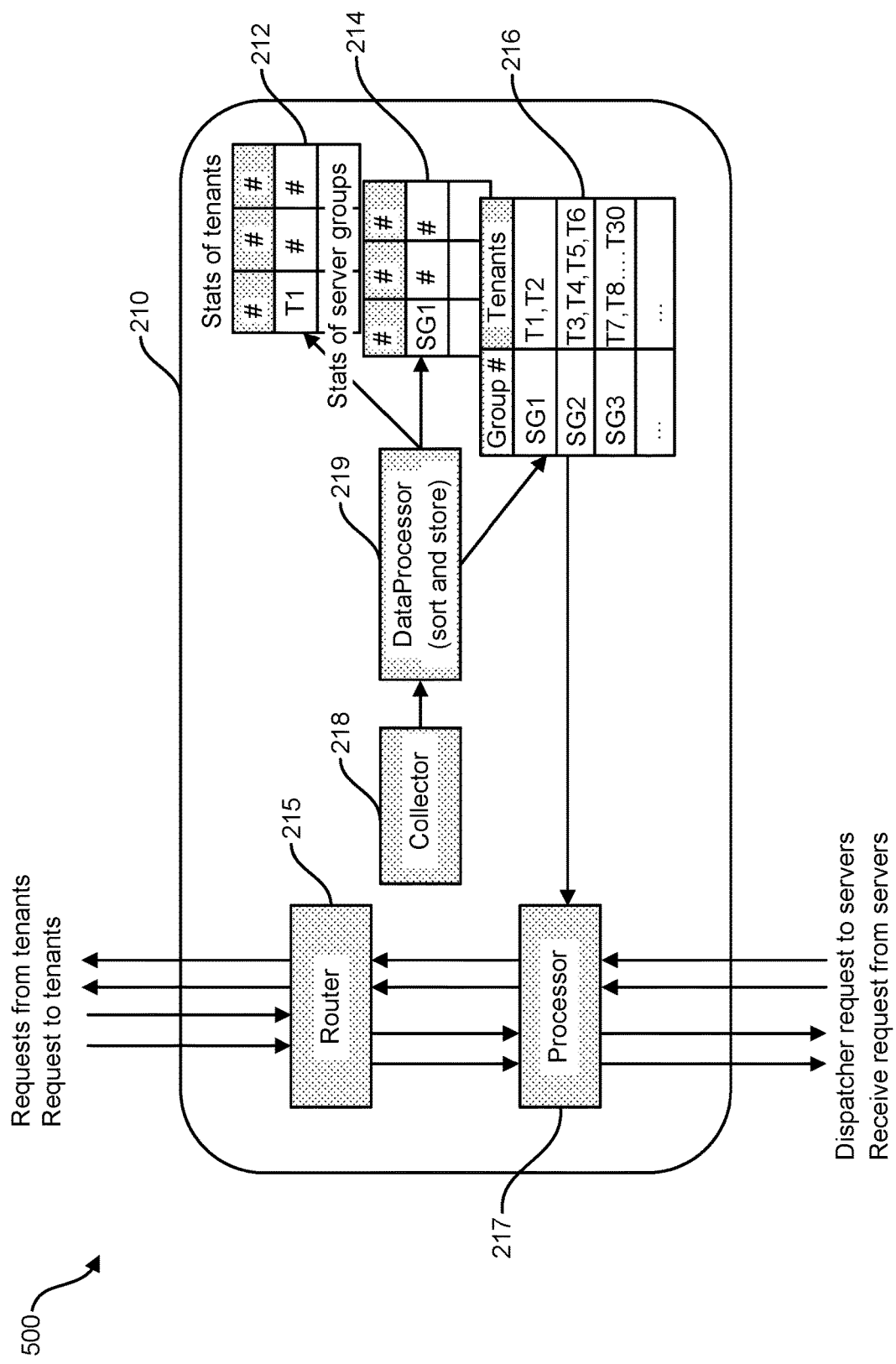
FIG. 5 is a second diagram illustrating the central monitor forming part of the load handler.

FIG. 2 is a diagram 200 illustrating further aspects of the current subject matter during a configuration phase in which the load balancer 140 logically groups the servers $150_1 \ldots _N$ into groups of X servers 150 (in this case X=2). In addition, the load balancer 140 can include a central monitor 210 which is an agent that monitors, generates, and stores a tenant table 212 that includes statistics of tenants $110_1 \ldots _N$ such as number of requests, data size of requests, data size of responses, time between requests and associated responses for each tenant 110 and the like. Moreover, the central monitor 210 can monitor, generate, and store a server group table 214 including statistics relating to groups of servers including available CPU capacity, available memory capacity, data traffic throughput (e.g., I/O), thread count and the like. The tenant table 212, the server group table 214, and the server group mapping table 216 (as described below) can be stored in a local data store such as a database or, in some cases, be part of a remote data store and/or database. Further, the tables 212, 214, 216 may form part of a single table or each table 212, 214, 216 can comprises multiple tables depending on the desired configuration. Additional information regarding the central monitor 210 is provided below in connection with FIGS. 3 and 5.

As mentioned above, the load balancer 140 can logically group severs into groups of two or more. With further reference to FIG. 2, a first group comprises two server $150_1$, $150_2$, a second group comprises servers $150_3$, $150_4$, continuing to servers $150_{N-1}$, $150_N$. Assuming there are N servers 150 in total, then there will be N/2 groups. It should be noted that other size groupings of servers by discrete numbers such as 3, 4, 5, etc. are also possible so that the total N servers 150 would be grouped into groups of N/3, N/4, N/5, etc. In other arrangements, servers 150 can be grouped in different sizes. That is, some servers 150 may be grouped as a set of 2, and concurrently in time, other servers 150 may be grouped into groups of 3, 4, 5, etc.

Figure 6:
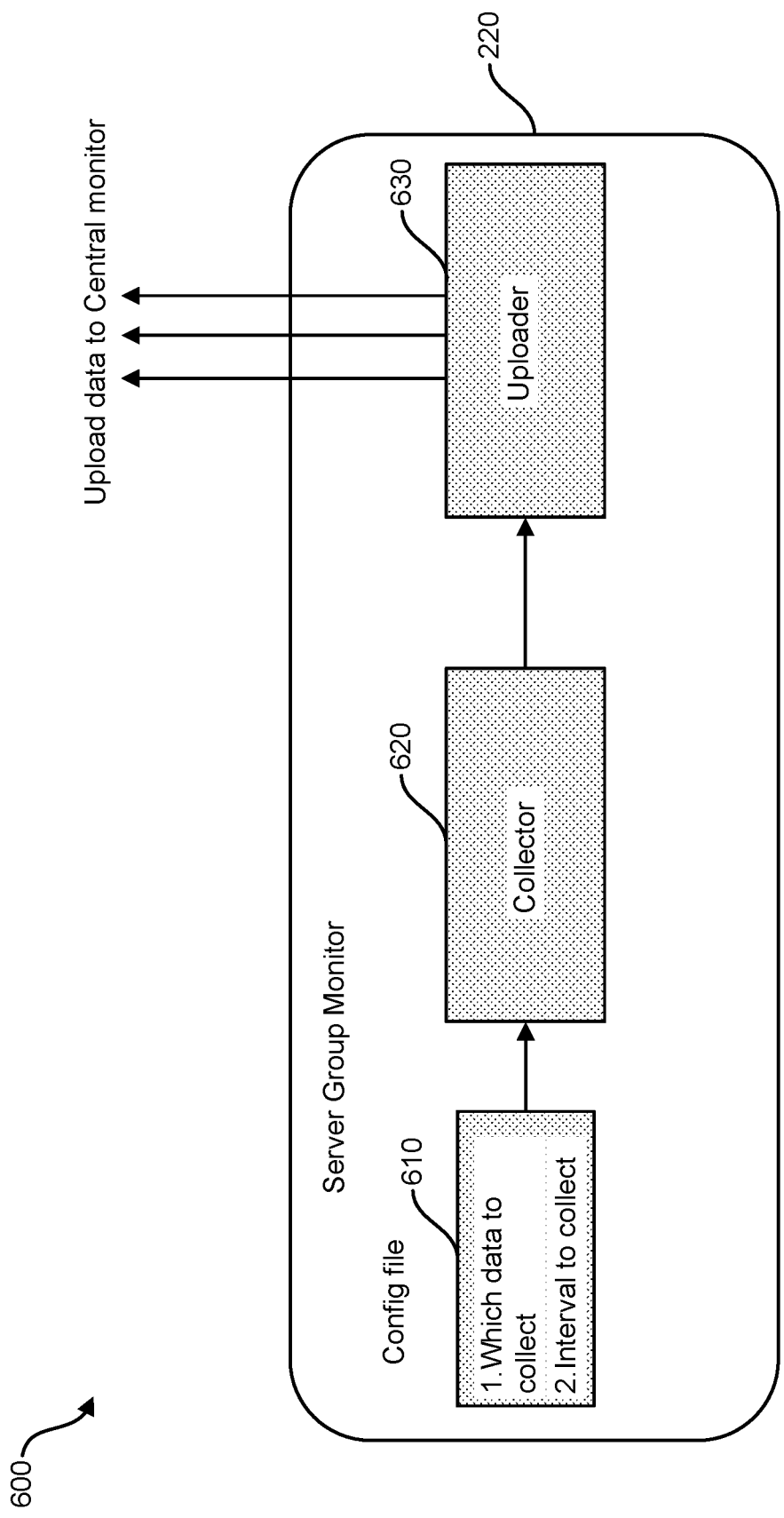
FIG. 6 is a diagram illustrating a server group monitor.

Each group of servers 150 can have a group monitor $220_1 \ldots _{N/2}$ which can be an agent being executed on each of the servers 150 in the group. In an alternative arrangement, the group monitors $220_1 \ldots _{N/2}$ may be separate hardware and software combinations specifically programmed to collect the necessary data and report it to the central monitor 210. The group monitors $220_1 \ldots _{N/2}$ can monitor CPU, memory, I/O of the corresponding servers within the group and transmit relevant data to the central monitor 210. The sampling rates of the group monitors 220 can be configured from sub-second sampling rates to sampling every few seconds so that information regarding server load can be utilized by the central monitor 210. With reference to diagram 600 of FIG. 6, the group monitors 220 can be agents that have a configuration file 610 which defines which data to collect for the servers 150 in the corresponding group and a sampling interval for such data collection. Based on the configuration file 610, a collector 620 can collect the specified data on the corresponding interval. An uploader 630 can be coupled to the collector 620 and can additionally transmit data to the central monitor 210 (which can be on a periodicity specified by the configuration filed 610).

Figure 3:
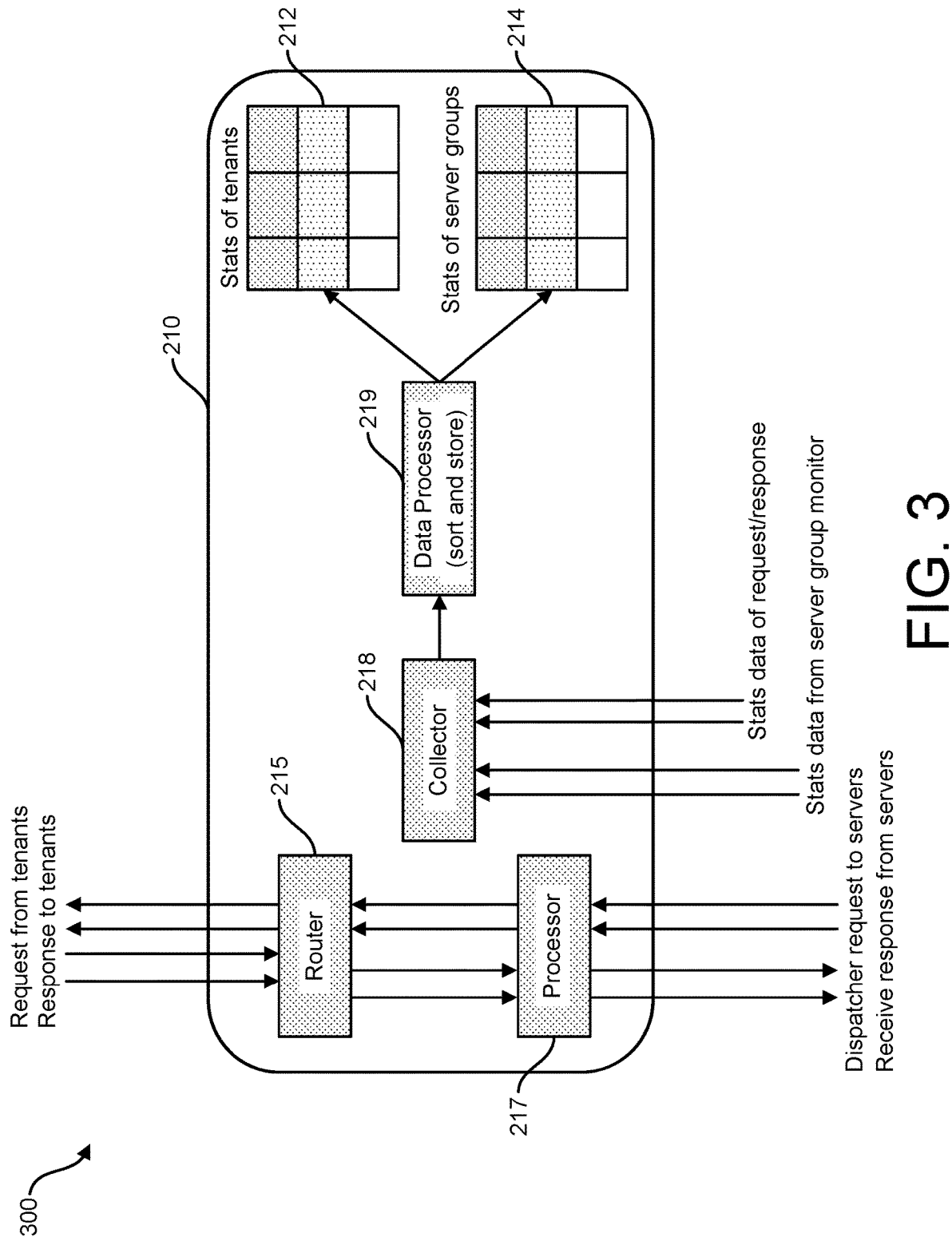
FIG. 3 is a first diagram illustrating a central monitor forming part of a load handler.

FIG. 3 is a system diagram 300 illustrating further aspects of the central monitor 210. The central monitor 210 can include a router 215 that receives requests from various tenants $110_1 \ldots _M$ and which can additionally send responses to requests to the tenants $110_1 \ldots _M$. The router 215 can interface with a processor 217 that acts to dispatch requests to servers $150_1 \ldots _N$ and, additionally, receive responses from servers $150_1 \ldots _N$. For example, the router 215 can cause a request to be routed to a particular server 150 in a server group according to various policies. These policies can provide, for example, include policy(a): for new requests choose a server group that based on current and/or projected workload, policy(b): for new requests only consider resource consumption data, or policy(c): consider both policy(a) and policy(b). In some cases, requests of a first form can be assigned to a first policy and requests of a second form can be assigned to a second, different policy. The processor 217 is responsible for executing the policies, and as mentioned above, to dispatch requests to servers 150$_{1 \ldots N}$. The central monitor 210 can additionally include a collector 218 that receives various statistics from the server group monitors 220$_{1 \ldots N/2}$. A data processor 219 can utilize the information obtained by the collector 218 to generate the tenant table 212 and the server group table 214.

As mentioned above, the central monitor 210 can generate and maintain a tenant table 212 which can be a table of aggregation statistics of each tenant such as number of requests, data size of requests, data size of responses, time between requests and associated responses for each tenant. The central monitor 210 can additionally generate and maintain a server table 214 which can be a table of attributes/statistics of each server group by combining, typically by adding, CPU, memory, IO, thread count, and the like of each server in each group. Both tables 212, 214 can utilize a certain time window such that only certain historical data (e.g., last 10 seconds, last 30 seconds, last minute, last hour, 12 hours, day, part of week like Monday-Friday or Saturday-Sunday, one or more weeks, one month, three months, etc.) is used to calculate metrics as provided below.

When a first request from a tenant 110 is received by the load balancer 140, the load balancer redirects the request to an idlest server group as indicated by traversing the server table 214 (which is based on information periodically sent by the respective group monitors 220 and received by the central monitor 210). In some cases, the load balancer 140 can redirect the first request to a different server group (i.e., not the idlest server group) if historical usage by tenants assigned to the idlest server group indicate that such server group may become busy handling requests concurrently with handling the first request. In such cases, cache hit rates are balanced with minimizing the likelihood of overburdening a particular server group with requests. When a subsequent request is received from that same tenant 110, the load balancer 140 redirects that request to the same server group as the first request (regardless of the current load from that server group). With such an arrangement, the cache hit ratio is at least 50%.

Subsequently received requests from other tenants will be treated in a similar manner; namely that the request will be dispatched to the server group having the least demand (i.e., the idlest group) as indicated by the server table 214.

As mentioned above, the group monitors 220$_{1 \ldots N/2}$ can continually report their data to the central monitor 210 so that current resource consumption data can be aggregated and stored in the server table 214.

The central monitor 210 can additionally track the total request numbers, response time or other information that can get for each tenant 110, and aggregate and sort the data in the tenant table 212. These items/attributes can form part of a tenant metric which, for example, can be have various weights. For example, the attributes can form part of a logistic regression model and can be configurable. For example, some applications and/or systems might have different weights. With some applications, response time might be critical, and as such, attributes relating to response time might be more heavily weighted than attributes relating to resource consumption. In addition, weights may also be adjusted to balance relative scales where some attributes may be whole numbers and other attributes may be fractions of whole numbers and thus otherwise masked by the larger valued whole number attributes.

The metric for a tenant can be a logistic regression in which attributes relating to the tenant are weighted such as Ti=requestNumber i*w1+responseTime1i*w2+ . . . .

$$Ti = \text{requestNumber}i * w1 + \text{responseTime}1i * w2 + \ldots$$

$$1 = \sum_{k=1}^{n} wi$$

The metric for a server group can similarly be a logistic regression in which attributes relating to the performance of the server group can be Gi=CPU Usagei*w'1+Memoryi*w'2+IOi*W'3+ . . . .

$$1 = \sum_{k=1}^{m} w'i$$

Each server group 220 can have two peer servers 150 that share the same database resources. If one server 150 is down or under heavy load (i.e., load above a threshold, etc.), the requests to a specific group will be handled by the other server 150. In some variations, the attribute CPU Usagei is the average CPU usage of the server group 220. If there are two active servers 150, CPU Usagei=(Server1 CPU Usagei+Server2 CPU Usagei)/2.

After the passing of a configuration phase time period (which an administrator can define), there will be two sorted tables. As provided herein, it can be assumed that the sorted statistics of tenants are T1>T2>T3> . . . ; the sorted statistics of server groups are G1>G2>G3> . . . .

Figure 4:
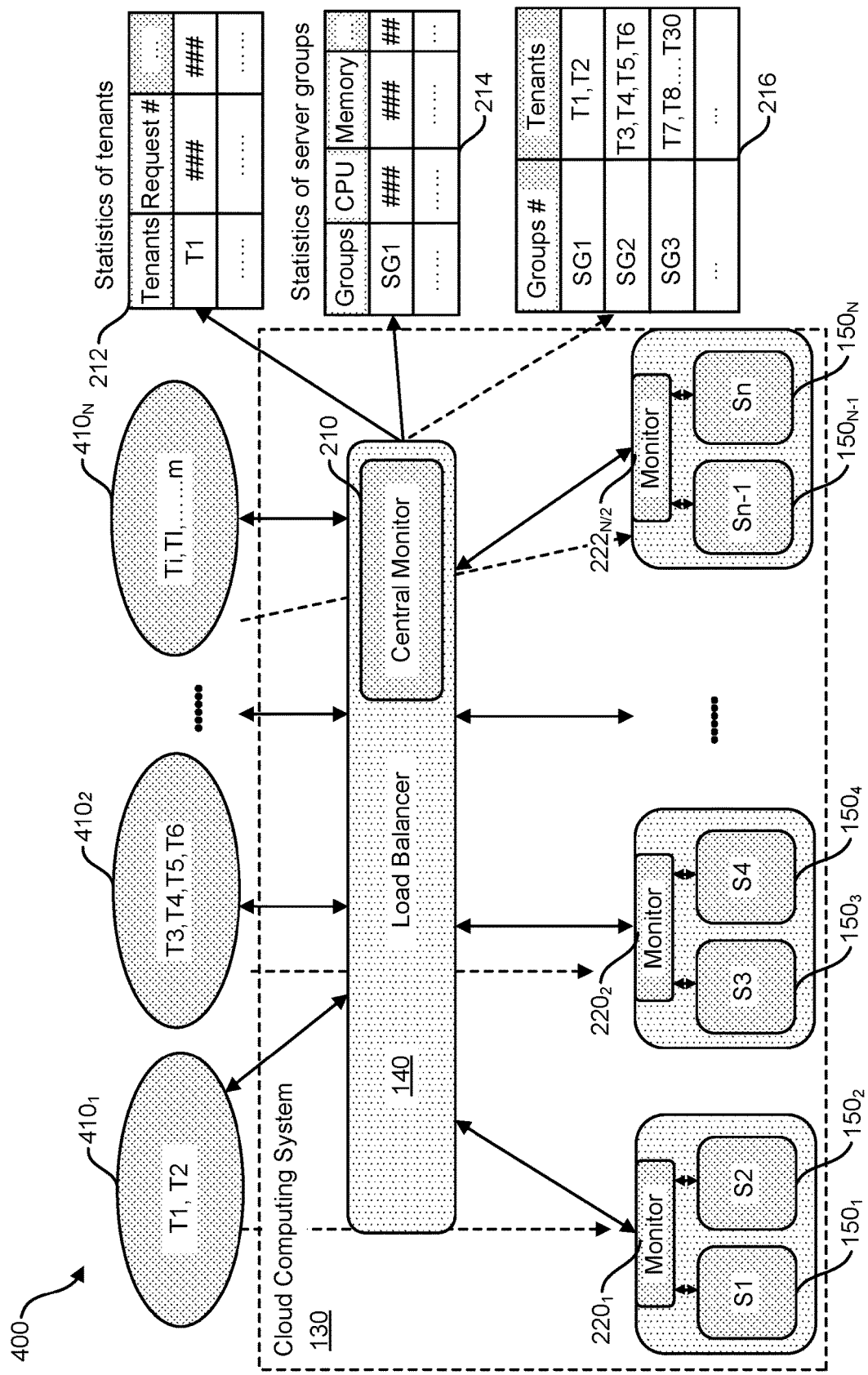
FIG. 4 is a second architecture diagram illustrating a cloud computing system.

According to the sorted statistics of tenants in the tenant table 212, the tenants 110 can be divided into N/2 groups such that each group has similar sum of metrics Ti. As shown in FIG. 4, during a runtime phase, these tenant groups 410$_{1 \ldots N}$ are logically related (as opposed to comprising dedicated or combined hardware). For example, the groups 410$_{1 \ldots N}$ may be (T1, T2), (T3, T4, T5, T6, T7), (T8, T9, . . . T30), (T31, . . . ) such that T1+T2≅T3+T4+T5+T6+T7≅T8+T9+T30≅T31+ . . . .

As part of the configuration phase, the central monitor 210 can generate a group mapping table 216 mapping sever groups to tenant groups (see diagram 400 of FIG. 4). With reference also to diagram 500 of FIG. 5, the data processor 219 can generate the group mapping table 216 based on the tenant table 212 and the server group table 214 as generated in a configuration phase as illustrated in FIG. 2. An example, group mapping table 216 is provided below at Table 1.

TABLE 1

| Server Group | Tenant Group |
| --- | --- |
| SG1 | T1, T2 |
| SG2 | T3, T4, T5, T6, T7 |
| SG3 | T8, T9, . . . T30 |
| . . . | . . . |

Once the group mapping table 216 has been generated, the load balancer 140 will redirect the requests according the group mapping table 216. For requests, the cache hit ratio is ~50%. By grouping tenants across two servers, scenarios can be avoided/lessened in which there are unexpected high volumes of requests and one server alone cannot adequately handle them. In other words, having two or more servers allows for backups while increasing cache hit ratio and increasing system stability. In some variations, the group mapping table 216 can be continually or periodically updated based on changing server group metrics (e.g., current resource consumption, etc.) and/or changing tenant metrics.

Figure 7:
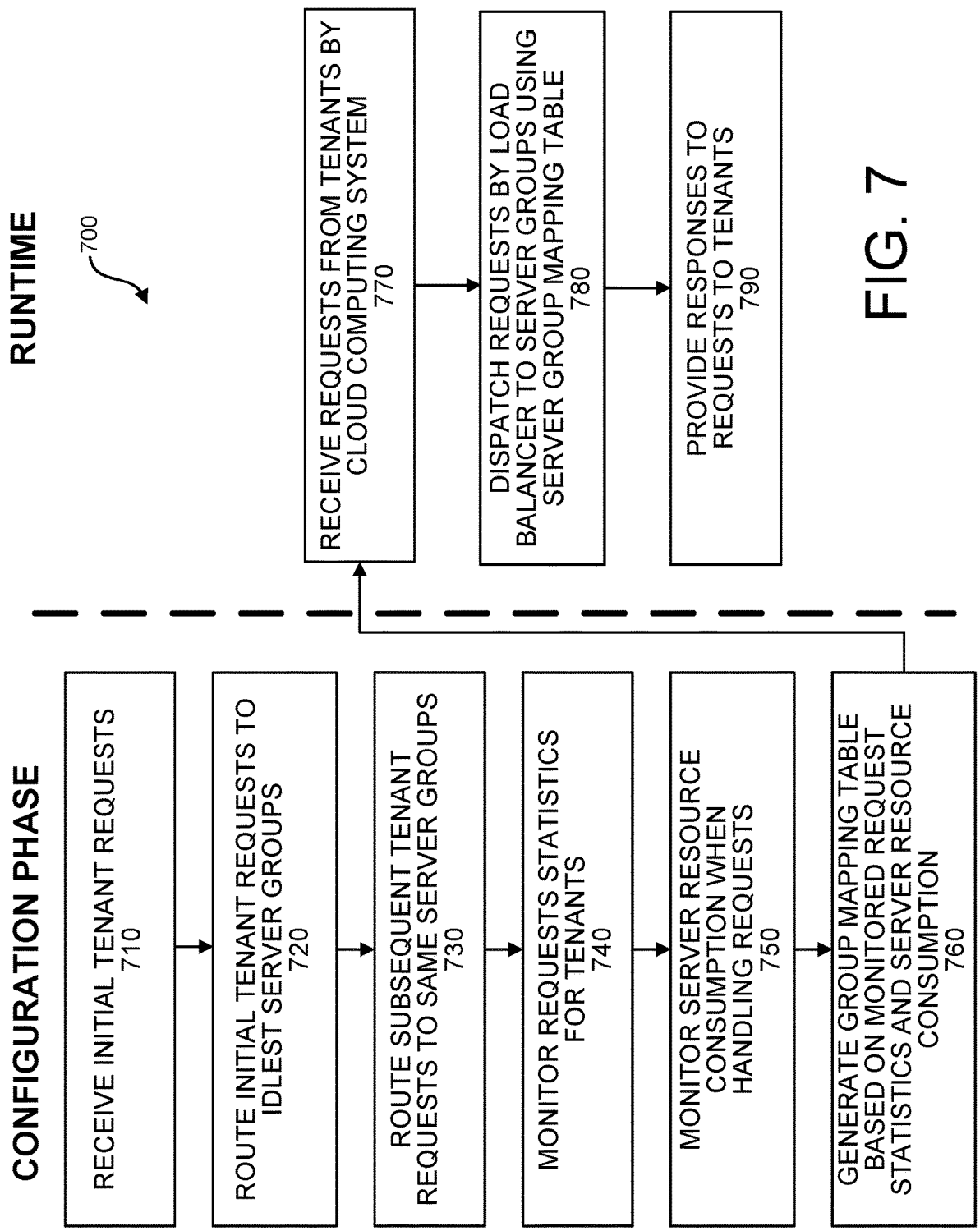
FIG. 7 is a process flow diagram illustrating adaptive handling of requests by tenants for handling by a cloud computing system.

FIG. 7 is a diagram 700 which illustrates certain aspects that occur during a configuration phase and certain aspects that occur during runtime. It will be appreciated that, in some variations, the tenant and server monitoring can be continuous causing the group mapping table to additionally be updated during runtime. Referring to FIG. 7, at 710, initial tenant requests are received for handling by a cloud computing system. These requests are routed, at 720, by a load balancer to an idlest server group at the time such requests are received. The idlest server group may be determined, for example, by accessing a server group table that is periodically updated regarding server load (e.g., sub-seconds to every few minutes, etc.). Once this initial routing has occurred, at 730, subsequent requests from the same server are routed to that same server group. Various statistics associated with execution and/or handling of the requests are monitored, at 740, on a tenant by tenant basis. Furthermore, at 750, server resource consumption is monitored when handling the requests. This monitored information (both tenant request related and server load related) is then used, at 760, to generate a group mapping table. This group mapping table is configured to optimize a hit ratio for the servers when executing subsequently received requests.

Once the group mapping table is generated, it can be used during runtime. In particular, at 770, a plurality of requests are received by the cloud computing system that originate from a plurality of tenants. The load balancer then, at 780, dispatches each request to be handled by one of a plurality of groups of servers based on a group mapping table (which as noted above is configured to optimize a cache hit ratio). The cloud computing system, at 790, provides responses to the requests to the respective tenants as generated by the respective groups of servers. As noted above, one or more of the request statistics and the resource consumption can be continually or periodically monitored so that the group mapping table can accordingly be updated so as to optimize the cache hit ratio when the cloud computing system subsequently encounters varying tenant load scenarios.

Figure 8:
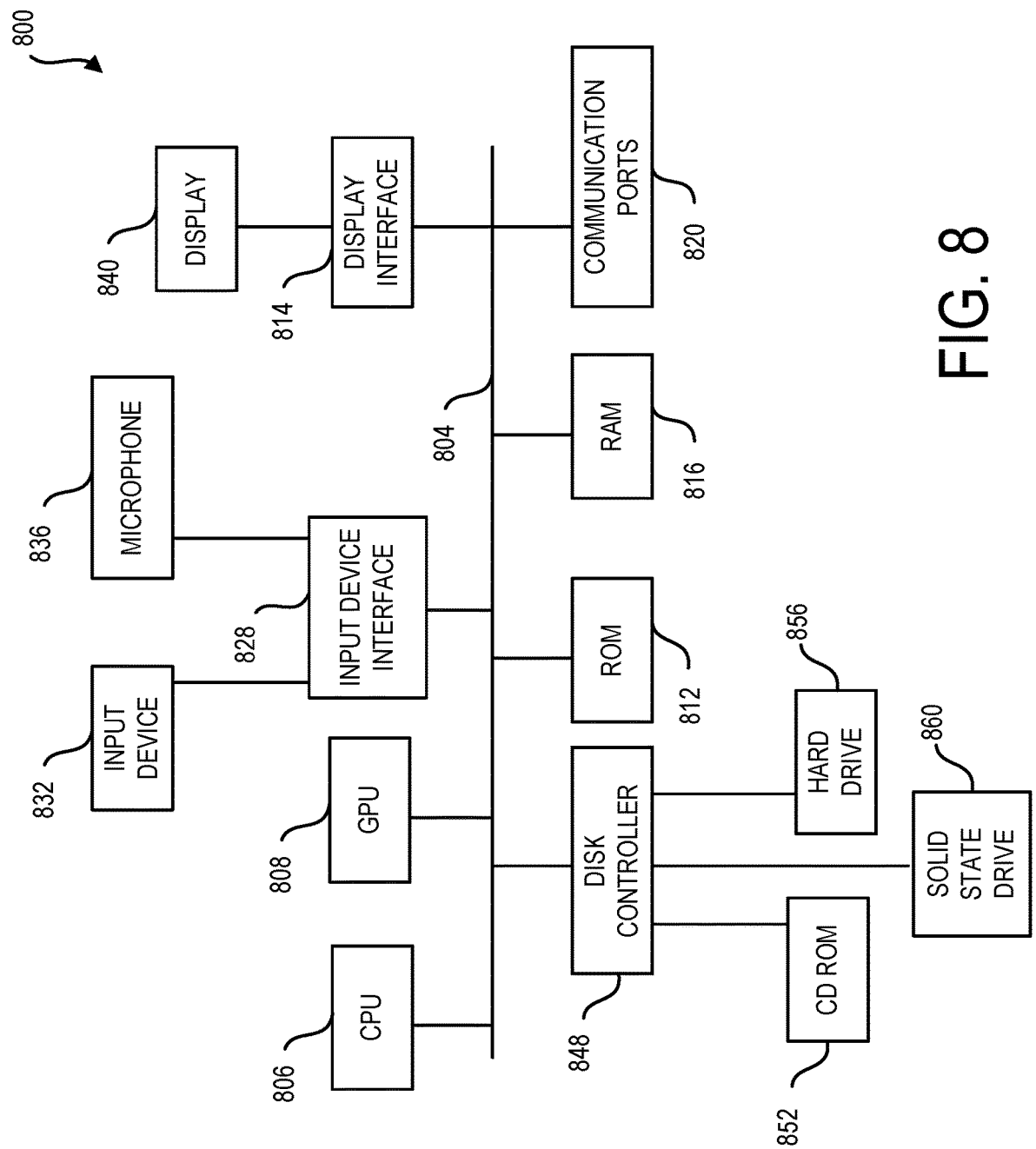
FIG. 8 is a diagram illustrating a computing device for implementing aspects of the current subject matter.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface with one or more optional disk drives to the system bus 804. These disk drives can be external or internal floppy disk drives such as 860, external or internal C𝒟-ROM, C𝒟-R, C𝒟-RW or 𝒟V𝒟, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the at least one communication port 820 includes or otherwise comprises a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 via a display interface 814 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. The input device 832 and the microphone 836 can be coupled to and convey information via the bus 804 by way of an input device interface 828. Other computing devices, such as dedicated servers, can omit one or more of the display 840 and display interface 814, the input device 832, the microphone 836, and input device interface 828.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, by a cloud computing system, a plurality of requests originating from a plurality of tenants;
   dispatching, by a load balancer forming part of the cloud computing system, each request to one of a plurality of groups of servers based on a group mapping table, each group of servers comprising a plurality of servers, each group of servers dispatching each request to one of the plurality of servers within such group of servers; and
   providing, by the cloud computing system, responses to the requests to the respective tenants as generated by the respective servers within the respective groups of servers;
   wherein the group mapping table is generated by:
      first monitoring historical request statistics for each of the tenants;
      second monitoring current resource consumption by the plurality of groups of servers when handling requests from the tenants; and
      associating each tenant with one of the groups of servers based on the first and second monitoring in order.

2. The method of claim 1, wherein there are N servers and there are N/2 groups of servers.

3. The method of claim 2 further comprising: generating a server group metric based on a weighting of values generated from the current resource consumption by servers including central processing unit (CPU) usage, memory consumption and input/output (I/O) consumption.

4. The method of claim 3 further comprising: generating a tenant metric based on a weighting of values generated for each tenant based on historical request metrics for the tenant including a monitored number of requests and response times to handle the requests.

5. The method of claim 4, wherein the group mapping table is configured so as to create groups of tenants having substantially similar aggregate tenant metrics.

6. The method of claim 1, wherein a group monitor associated with each group of servers provides the current resource consumption by the groups of servers when handling requests from the tenants.

7. The method of claim 6, wherein the group monitors are software agents executing on the servers of the respective groups of server.

8. The method of claim 7, wherein the group monitors transmit the current resource consumption information to a central monitor forming part of the load balancer.

9. The method of claim 8, wherein the central monitor is executed on a server distinct and separate from the load balancer.

10. The method of claim 8, wherein the central monitor is an agent executed by the load balancer.

11. A system comprising:
    at least one data processor; and
    memory storing instructions which, when executed by the at least one data processor, result in operations comprising:
      receiving, by a cloud computing system, a plurality of requests originating from a plurality of tenants;
      dispatching, by a load balancer forming part of the cloud computing system, each request to one of a plurality of groups of servers based on a group mapping table, each group of servers comprising a plurality of servers, each group of servers dispatching each request to one of the plurality of servers within such group of servers; and
      providing, by the cloud computing system, responses to the requests to the respective tenants as generated by the respective servers within the respective groups of servers;
    wherein the group mapping table is generated by:
      first monitoring historical request statistics for each of the tenants;
      second monitoring current resource consumption by the plurality of groups of servers when handling requests from the tenants; and
      associating each tenant with one of the groups of servers based on the first and second monitoring.

12. The system of claim 11, wherein there are N servers and there are N/2 groups of servers.

13. The system of claim 12, wherein the operations further comprise: generating a server group metric based on a weighting of values generated from the current resource consumption by servers including central processing unit (CPU) usage, memory consumption and input/output (I/O) consumption.

14. The system of claim 13, wherein the operations further comprise: generating a tenant metric based on a weighting of values generated for each tenant based on historical request metrics for the tenant including a monitored number of requests and response times to handle the requests.

15. The system of claim 14, wherein the group mapping table is configured so as to create groups of tenants having substantially similar aggregate tenant metrics.

16. The system of claim 11, wherein a group monitor associated with each group of servers provides the current resource consumption by the groups of servers when handling requests from the tenants.

17. The system of claim 16, wherein the group monitors are software agents executing on the servers of the respective groups of servers.

18. The system of claim 17, wherein the group monitors transmit the current resource consumption information to a central monitor forming part of the load balancer.

19. The system of claim 11, wherein a central monitor forming part of the load balancer provides the historical request statistics by the tenants and is an agent executed by the load balancer.

20. A computer-implemented method comprising:
first monitoring request statistics associated with a plurality of requests received by a cloud computing system originating from each of a plurality of tenants;
second monitoring resource consumption by groups of servers forming part of the cloud computing system when handling the plurality of requests received by the cloud computing system;
generating tenant metrics for each tenant based on the first monitoring;
generating server group metrics for each group of servers based on the second monitoring;
generating, based on the generated tenant metrics and the generated server group metrics, a group mapping table configured to optimize a cache hit ratio by the groups of servers;
receiving, by the cloud computing system, a plurality of new requests originating from a plurality of tenants;
dispatching, by a load balancer forming part of the cloud computing system, each new request to one of a plurality of groups of servers based on the group mapping table, each group of servers comprising a plurality of servers, each group of servers dispatching each request to one of the plurality of servers within such group of servers; and
providing, by the cloud computing system, responses to the new requests to the respective tenants as generated by the respective servers within the respective groups of servers.

* * * * *